United States Patent
Wang

(10) Patent No.: US 12,028,470 B2
(45) Date of Patent: Jul. 2, 2024

(54) FOLDABLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Wenqiang Wang, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/618,430

(22) PCT Filed: Nov. 30, 2021

(86) PCT No.: PCT/CN2021/134653
§ 371 (c)(1),
(2) Date: Dec. 10, 2021

(87) PCT Pub. No.: WO2023/082373
PCT Pub. Date: May 19, 2023

(65) Prior Publication Data
US 2024/0015241 A1    Jan. 11, 2024

(30) Foreign Application Priority Data

Nov. 15, 2021    (CN) .......................... 202111348197.4

(51) Int. Cl.
*H04M 1/02*    (2006.01)

(52) U.S. Cl.
CPC ......... *H04M 1/0268* (2013.01); *H04M 1/022* (2013.01)

(58) Field of Classification Search
CPC .... G06F 1/1652; G06F 1/1681; G06F 1/1616; G06F 1/1641; G06F 1/1656;
(Continued)

(56) References Cited

U.S. PATENT DOCUMENTS

| | | | |
|---|---|---|---|
| 2009/0013500 A1 | 1/2009 | Ueyama et al. | |
| 2021/0149436 A1* | 5/2021 | Myung | H04M 1/022 |
| 2021/0271294 A1* | 9/2021 | Liao | G06F 1/181 |

FOREIGN PATENT DOCUMENTS

| | | |
|---|---|---|
| CN | 108076171 A | 5/2018 |
| CN | 108999882 A | 12/2018 |

(Continued)

OTHER PUBLICATIONS

International Search Report in International application No. PCT/CN2021/134653, dated Jul. 27, 2022.
(Continued)

*Primary Examiner* — Golam Sorowar
(74) *Attorney, Agent, or Firm* — PV IP PC; Wei Te Chung; Zhigang Ma

(57) ABSTRACT

A foldable display device includes a folding module and a flexible display module. The folding module includes a first folding frame, a second folding frame disposed relatively to the first folding frame, and a connection structure connected to the first folding frame and the second folding frame. The connection structure includes a position restricting component. The first folding frame and the second folding frame are folded or unfolded relating to a shaft of the folding module. When the first folding frame and the second folding frame are completely unfolded, a position restricting angle between the first folding frame and the second folding frame is restricted by the position restricting component. A flexible display module is disposed on the first folding frame, the second folding frame, and the connection structure.

18 Claims, 8 Drawing Sheets

(58) Field of Classification Search
CPC ............. G06F 1/1635; G06F 1/1618; G06F 2200/1632; G06F 1/1677; G06F 1/1683; G06F 1/1698; G06F 1/1624; G06F 1/1626; G06F 1/1647; G06F 1/16; G06F 1/1615; G06F 1/1637; G06F 1/1686; G06F 1/203; G06F 2203/04102; G06F 2203/04803; G06F 1/1601; G06F 1/1643; G06F 1/3265; H04M 1/0268; H04M 1/0216; H04M 1/0214; H04M 1/022; H04M 2250/16; H04M 1/0222; H04M 1/0247; H04M 1/0235; H04M 1/0243; H04M 1/0264; H04M 1/72427; H04M 2250/20; H04M 2250/22; H04M 1/0245; H04M 1/0266; H04M 1/0274; H04M 1/0277; H04M 2201/38

See application file for complete search history.

(56) References Cited

FOREIGN PATENT DOCUMENTS

| CN | 109469680 A | 3/2019 |
|---|---|---|
| CN | 110005695 A | 7/2019 |
| CN | 111583787 A | 8/2020 |
| CN | 111706604 A | 9/2020 |
| CN | 111986568 A | 11/2020 |
| CN | 112041916 A | 12/2020 |
| CN | 112178042 A | 1/2021 |
| CN | 113452819 A | 9/2021 |
| CN | 113539090 A | 10/2021 |
| CN | 113643612 A | 11/2021 |
| WO | 2021007978 A1 | 1/2021 |
| WO | 2021209008 A1 | 10/2021 |
| WO | 2021223537 A1 | 11/2021 |

OTHER PUBLICATIONS

Written Opinion of the International Search Authority in International application No. PCT/CN2021/134653, dated Jul. 27, 2022.
Chinese Office Action issued in corresponding Chinese Patent Application No. 202111348197.4 dated Jun. 22, 2022, pp. 1-9.

* cited by examiner (A)

(B)

FOLDABLE DISPLAY DEVICE

BACKGROUND OF INVENTION

Field of Invention

The present application relates to a field of display technology, and particularly to a foldable display device.

Description of Prior Art

Foldable mobile phones are one of concerned products in the market of consumer electronics in recent years. After these products have been launched on market, it has been favored by a wide range of consumers. Compared to traditional mobile phones, a method of folding screens of mobile phones in half is adopted to realize folding and unfolding of the screen, which can achieve an effect of increasing a display area without significantly increasing a size of whole machines. However, because this design method requires the screens to be folded in half, a bending radius of the screens is required to be very small to control the size of the whole machines within a certain range. Furthermore, if the bending radius of the screens is designed to be very small, plastic deformation of materials of film layers at bending regions of the screens is very significant. Bending for a long time can directly cause a problem of obvious fold marks. The problem of the fold marks has always been one of important reasons affecting further expansion of the market of the foldable mobile phones. Currently, no reasonable solution for how to effectively reduce the problem of the fold marks of the screens has been found.

Mechanism and processes of the problem of the fold marks appearing on the foldable mobile phones are very complicated. Taking organic light emitting diode (OLED) display screens as example, factors such as module materials, bending characteristics, folding hinges, and rationality of with whole machines are main reasons causing the fold marks to appear on the screens. Specifically, if a design of folding hinge mechanisms is unreasonable, tracks of bending movement of the screens during folding and unfolding cannot match tracks of movement of middle frames of the mobile phones. Therefore, the screens are pulled and squeezed at various degrees, i.e., the screens suffers additional stress. When display screens of the foldable mobile phones are bent to a certain numbers, microscopic damage between materials of the display screen and material interface layers can be accumulated to a certain degree and scale, and then gradually becomes into macroscopic visible fold marks.

In addition, due to pursuit of ultra-light and thin design of current folding mobile phones, the bending radius of the screens is required to be smaller, and plastic deformation of module materials in the bending region of the screens is proportional to the bending radius. When local strain of the screens exceeds a limit plastic strain value, irreversible plastic deformation is directly formed. Furthermore, increment of bending fatigue times can directly cause significant fold marks. Therefore, how to effectively relieve the problem of the fold marks of the screens is an important technical problem.

Due to pursuit of ultra-light and thin design of current folding mobile phones and requirement of the smaller bending radius of the screens, the current foldable mobile phones have a technical problem of significant fold marks.

SUMMARY OF INVENTION

In order to solve the aforesaid technical problem, the present application provides a foldable display device. In the foldable display device of the present application, a connection structure is connected to a first folding frame and a second folding frame. Furthermore, by design of a first position restricting bar, a second position restricting bar, a first chute, and a second chute, a limit unfolded angle of the connection structure being able to be greater than 180 degrees is realized. Therefore, when a flexible display module is completely unfolded, it is slightly stretched and returns to a flat state, and a force state, optical characteristics of a screen, and human senses of the flexible display module are not significantly affected.

On the basis of the aforesaid purpose, the present application provides a foldable display device including a folding module and a flexible display module. The folding module includes a first folding frame, a second folding frame, and a connection structure. The second folding frame is disposed relatively to the first folding frame. The connection structure is connected to the first folding frame and the second folding frame, and the connection structure includes a position restricting component. The first folding frame and the second folding frame are folded or unfolded relating to a shaft of the folding module. When the first folding frame and the second folding frame are completely unfolded, a position restricting angle between the first folding frame and the second folding frame is restricted by the position restricting component, and the position restricting angle is greater than 180 degrees. The flexible display module is disposed on the first folding frame, the second folding frame, and the connection structure and is simultaneously folded or unfolded with the first folding frame and the second folding frame.

In one embodiment of the foldable display device of the present application, the connection structure includes a first connection component and a second connection component, the first connection component is disposed on the first folding frame, the second connection component is disposed on the second folding frame, and the first connection component and the second connection component rotate relatively.

In one embodiment of the foldable display device of the present application, when an included angle between the first connection component and the second connection component is rotated to the position restricting angle, the position restricting component restricts the first connection component and the second connection component to rotate.

In one embodiment of the foldable display device of the present application, the position restricting component includes a first position restricting bar and a second position restricting bar, a first chute is defined in the first connection component, and a second chute is defined in the second connection component.

In one embodiment of the foldable display device of the present application, the first chute is parallel to the first folding frame, the second chute is parallel to the second folding frame.

In one embodiment of the foldable display device of the present application, the first position restricting bar is slidably penetrated the first chute, the second position restricting bar is slidably penetrated the second chute, a displacement route of the first position restricting bar is restricted by the first chute, and a displacement route of the second position restricting bar is restricted by the second chute.

In one embodiment of the foldable display device of the present application, when the first folding frame and the second folding frame become to a completely unfolded state from a folded state, the first position restricting bar and the second position restricting bar slide toward directions away from the shaft in the first chute and the second chute.

In one embodiment of the foldable display device of the present application, the first connection component further includes a first gear plate, the second connection component further includes a second gear plate, the first chute is defined in the first gear plate, and the second chute is defined in the second gear plate.

In one embodiment of the foldable display device of the present application, when the first folding frame and the second folding frame are folded or unfolded, the first position restricting bar slides in the first chute and drives the first gear plate to rotate, and the second position restricting bar slides in the second chute and drives the second gear plate to rotate.

In one embodiment of the foldable display device of the present application, when the first folding frame and the second folding frame are folded or unfolded, the first gear plate and the second gear plate are driven by the first position restricting bar and the second position restricting bar to rotate relatively. In one embodiment of the foldable display device of the present application, the first connection component further includes a first transmission gear, the second connection component further includes a second transmission gear, the first transmission gear and the second transmission gear are engaged with each other, the first gear plate and the first transmission gear are engaged with each other, the second transmission gear and the second gear plate are engaged with each other, and the first transmission gear and the second transmission gear are disposed between the first gear plate and the second gear plate.

In one embodiment of the foldable display device of the present application, the first connection component further includes a first pivot plate, the second connection component further includes a second pivot plate, the first pivot plate and the second pivot plate are respectively disposed on the first folding frame and the second folding frame, and the first pivot plate and the second pivot plate are respectively connected to the first position restricting bar and the second position restricting bar.

In one embodiment of the foldable display device of the present application, the connection structure further includes a first connection unit, a second connection unit, and a third connection unit, the first component further includes a first connection shaft and a first elasticity element, the second connection component further includes a second connection shaft and a second elasticity element, the first connection shaft penetrates the third connection unit, the first gear plate, the second connection unit, the first elasticity element, and the first connection unit in sequence, and the second connection shaft penetrates the third connection unit, the second gear plate, the second connection unit, the second elasticity element, and the first connection unit in sequence.

In one embodiment of the foldable display device of the present application, the position restricting angle is 181.5 degrees.

On the basis of the aforesaid purpose, the present application further provides a foldable display device including a folding module and a flexible display module. The folding module includes a first folding frame, a second folding frame, and a connection structure. The second folding frame is disposed relatively to the first folding frame. The connection structure is connected to the first folding frame and the second folding frame, and the connection structure includes a position restricting component. The first folding frame and the second folding frame are folded or unfolded relating to a shaft of the folding module. When the first folding frame and the second folding frame are completely unfolded, a position restricting angle between the first folding frame and the second folding frame is restricted by the position restricting component, and the position restricting angle is greater than 180 degrees and less than 183 degrees. The flexible display module is disposed on the first folding frame, the second folding frame, and the connection structure and is simultaneously folded or unfolded with the first folding frame and the second folding frame.

In one embodiment of the foldable display device of the present application, the connection structure includes a first connection component and a second connection component, the first connection component is disposed on the first folding frame, the second connection component is disposed on the second folding frame, and the first connection component and the second connection component rotate relatively. When an included angle between the first connection component and the second connection component is rotated to the position restricting angle, the position restricting component restricts the first connection component and the second connection component to rotate.

In one embodiment of the foldable display device of the present application, the position restricting component includes a first position restricting bar and a second position restricting bar, a first chute is defined in the first connection component, a second chute is defined in the second connection component, the first chute is parallel to the first folding frame, the second chute is parallel to the second folding frame, the first position restricting bar is slidably penetrated the first chute, the second position restricting bar is slidably penetrated the second chute, a displacement route of the first position restricting bar is restricted by the first chute, and a displacement route of the second position restricting bar is restricted by the second chute.

In one embodiment of the foldable display device of the present application, when the first folding frame and the second folding frame become to a completely unfolded state from a folded state, the first position restricting bar slides toward a direction away from the shaft in the first chute, and the second position restricting bar slides toward a direction away from the shaft in the second chute.

In one embodiment of the foldable display device of the present application, the first connection component further includes a first gear plate, the second connection component further includes a second gear plate; the first chute is defined in the first gear plate; the second chute is defined in the second gear plate; when the first folding frame and the second folding frame are folded or unfolded, the first position restricting bar slides in the first chute and drives the first gear plate to rotate, and the second position restricting bar slides in the second chute and drives the second gear plate to rotate; and when the first folding frame and the second folding frame are folded or unfolded, the first gear plate and the second gear plate are driven by the first position restricting bar and the second position restricting bar to rotate relatively.

In one embodiment of the foldable display device of the present application, the first connection component further includes a first transmission gear and a first pivot plate, the second connection component further includes a second transmission gear and a second pivot plate, the first transmission gear and the second transmission gear are engaged with each other, the first gear plate and the first transmission gear are engaged with each other, the second transmission gear and the second gear plate are engaged with each other, the first transmission gear and the second transmission gear are disposed between the first gear plate and the second gear plate, the first pivot plate and the second pivot plate are respectively disposed on the first folding frame and the second folding frame, and the first pivot plate and the second pivot plate are respectively connected to the first position restricting bar and the second position restricting bar.

In the foldable display device of the present application, the connection structure is connected to a first folding frame and a second folding frame, and by design of the first position restricting bar, a second position restricting bar, the first chute, and the second chute, the limit unfolded angle of the connection structure being able to be greater than 180 is realized. Therefore, when a flexible display module is completely unfolded, it is slightly stretched and returns to a flat state, and a force state of the flexible display module, optical characteristics of a screen, and human senses are not significantly affected.

DETAILED DESCRIPTION OF EMBODIMENTS

Figure 1:
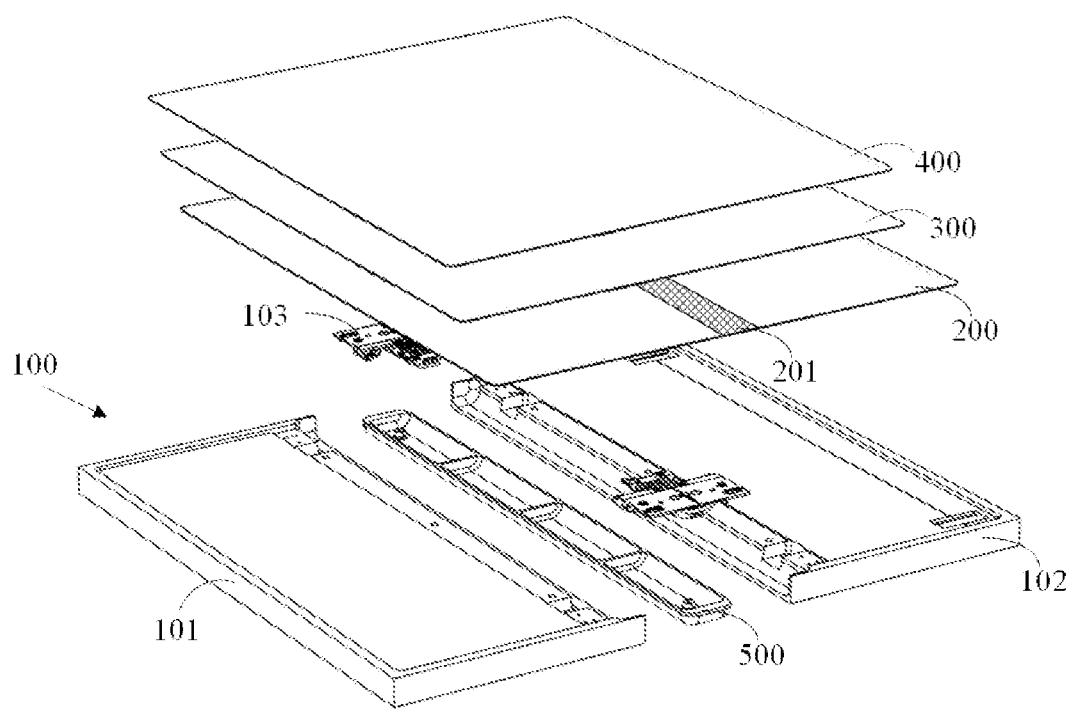
FIG. 1 is a first assembling schematic diagram of a foldable display device of the present application.
Figure 2:
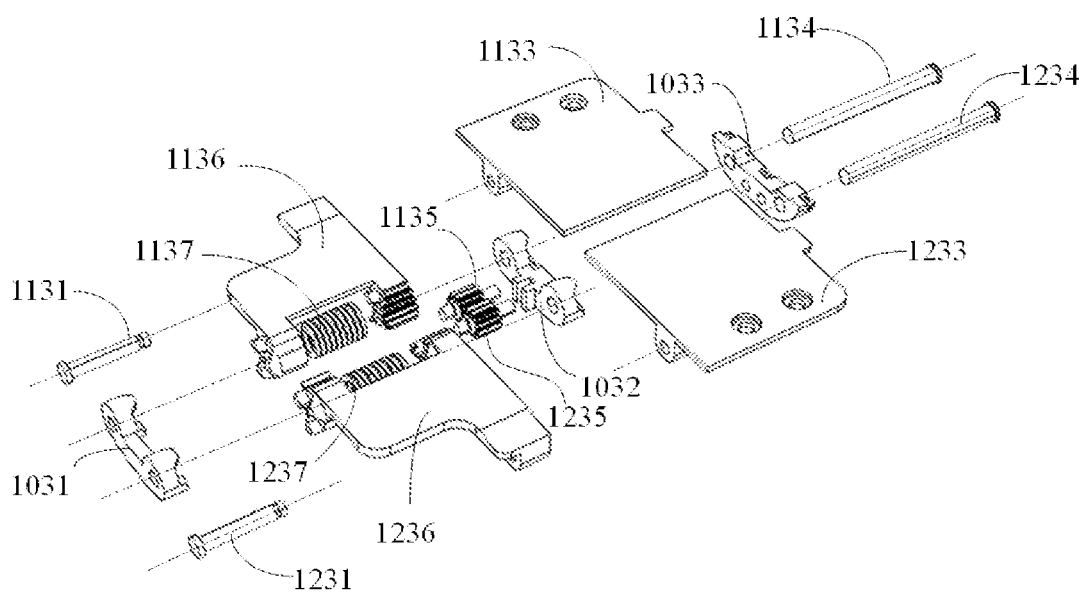
FIG. 2 is a second assembling schematic diagram of the foldable display device of the present application.
Figure 3:
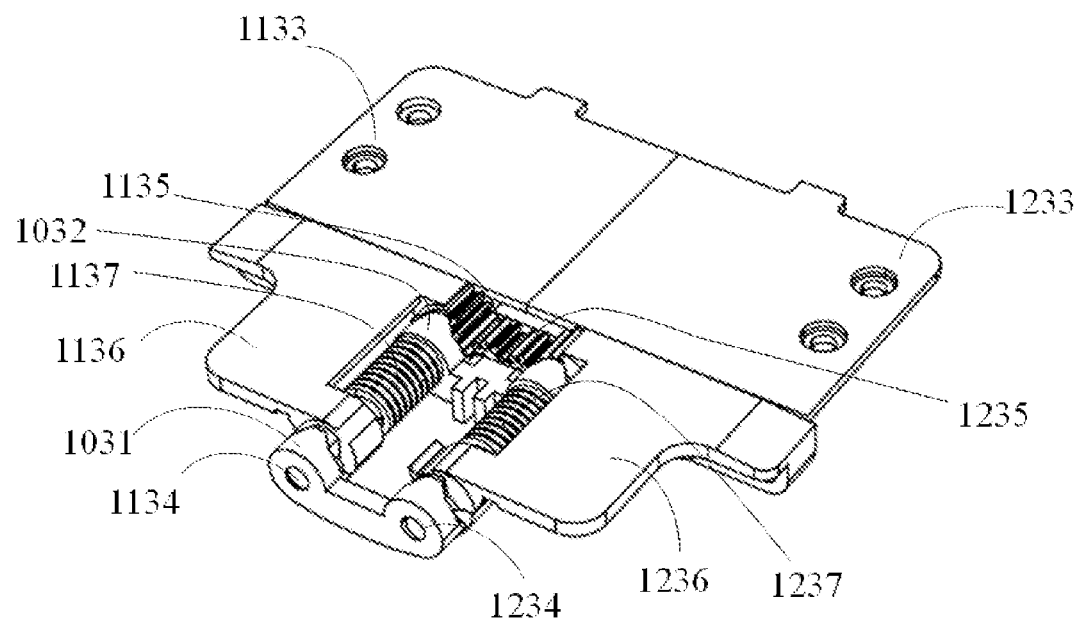
FIG. 3 is a third assembling schematic diagram of the foldable display device of the present application.
Figure 4:
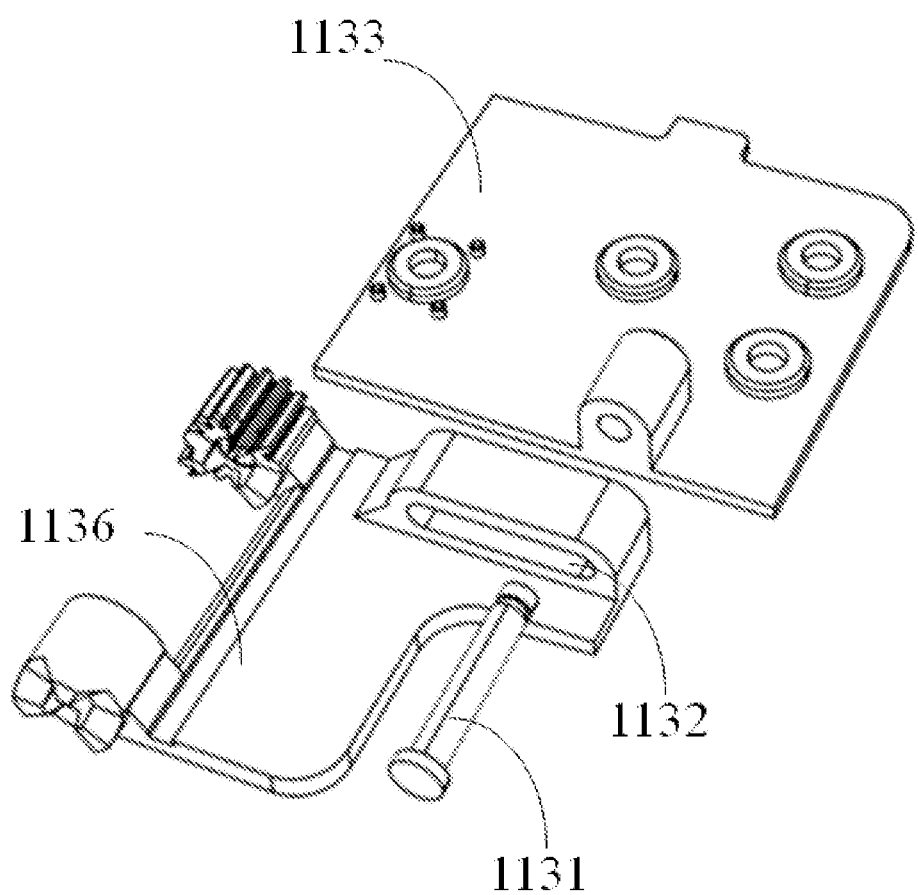
FIG. 4 is a fourth assembling schematic diagram of the foldable display device of the present application.
Figure 5:
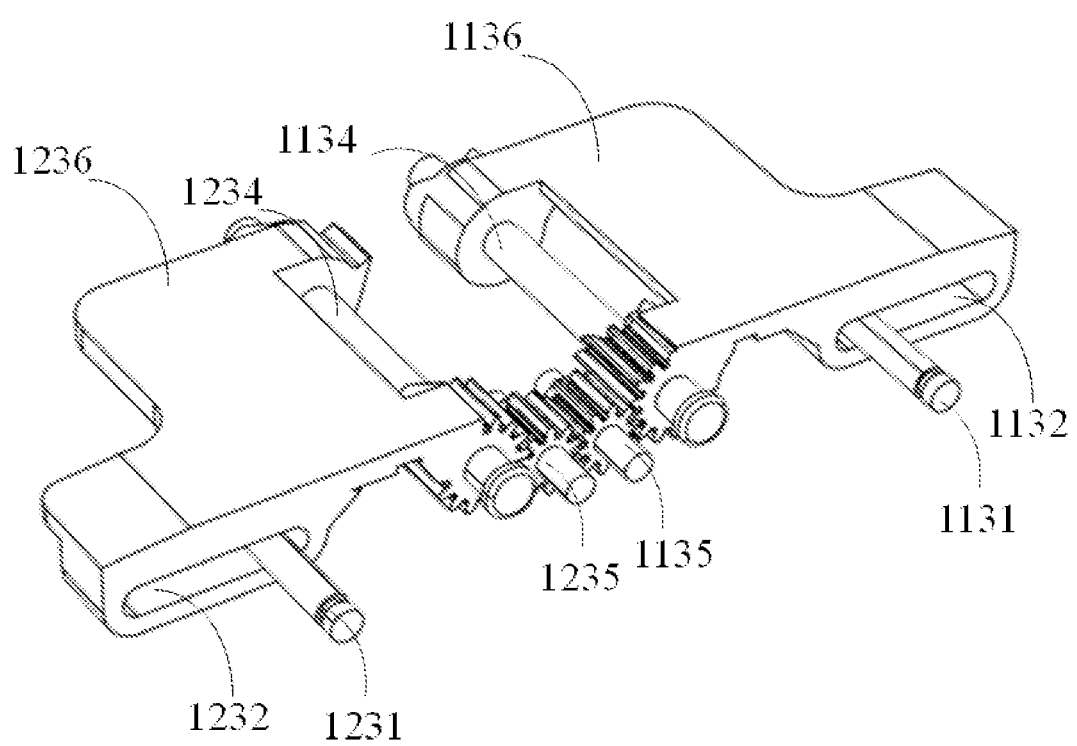
FIG. 5 is a fifth assembling schematic diagram of the foldable display device of the present application.

In order to allow the above and other purposes, features, and advantages of the present application to be more obvious and easier to understand, preferred embodiments of the present application will be particularly described hereinafter, and with reference to the accompanying drawings, a detailed description will be given below. Moreover, the directional terms of which the present application mentions, for example, "upper", "lower", "top", "bottom", "front", "rear", "left", "right", "inside", "outside", "side", "circumference", "center", "horizontal", "vertical", "axial", "radial", "top layer", "bottom layer", etc., only refer to directions of the accompanying figures. Therefore, the used directional terms are for illustrating and understanding the present application, but not for limiting the present application.

In the figures, units with similar structures are indicated by the same reference numerals.

As illustrated in FIG. 1, a foldable display device of the present application includes a folding module 100, a support plate 200, a buffer layer 300, and a flexible display module 400. The buffer layer 300 is disposed on the support plate 200. The flexible display module 400 is disposed on the buffer layer 300. Furthermore, the foldable display device can be various foldable display devices having a display function, such as a foldable mobile phone, a foldable display screen.

Furthermore, the support plate 200 can include a folding structure 201 and is disposed on the folding module 100, and a position of the folding structure 201 corresponds to an axis of the folding module 100. In detail, the axis of the folding module 100 can be a bending position when the folding module 100 is folded. The support plate 200 is configured to support the buffer layer 300 and the flexible display module 400 and to maintain the flexible display module 400 to be flat.

As illustrated in FIG. 1, in one embodiment, the support plate 200 can be made of stainless steel, but is not limited thereto. The folding structure 201 can be realized by forming a reticular structure or a plurality of holes on the support plate 200 through a patterning process. In another embodiment, the folding structure 201 of the support plate 200 can be made of the a flexible material, and other part of the support plate 300 can be made of a rigid material.

As illustrated in FIG. 1, in one embodiment, the buffer layer 300 includes graphite and acrylic foam. The flexible display module 400 can be attached on the support plate 200 by the buffer layer 300. Furthermore, because the buffer layer 300 includes graphite, it is facilitate to heat dissipation of flexible display module 400.

As illustrated in FIG. 1, in one embodiment, the flexible display module 400 includes a flexible display panel. Specifically, the flexible display panel can be a flexible organic light-emitting diode panel, a flexible mini light-emitting diode (mini-LED) panel, or a flexible micro light-emitting diode (micro-LED) panel, etc.

As illustrated in FIG. 1, in one embodiment, the foldable display device further includes a protection cover 500 to prevent dust, etc. from affecting the foldable display device.

In the present application, the folding module 100 is designed to be unfolded by more than 180 degrees, so after the folding module 100 is unfolded, fold marks of the flexible display module 400 disposed on the folding module 100 can be reduced when the flexible display module 400 is unfolded. In the present application, under a situation that a force state of a screen display device layer, optical characteristics of a screen, and human senses are not affected, the problem of fold marks of the screen can be relieved.

As illustrated in FIG. 1, in a further description, the folding module 100 includes a first folding frame 101, a second folding frame 102, and a connection structure 103. The second folding frame 202 is disposed relatively to the first folding frame 101. The connection structure 103 is connected to the first folding frame 101 and the second folding frame 102, and the connection structure 103 includes a position restricting component. The first folding frame 101 and the second folding frame 102 are folded or unfolded relating to a shaft of the folding module 100. Furthermore, when the first folding frame 101 and the second folding frame 102 are completely unfolded, a position restricting angle between the first folding frame 101 and the second folding frame 102 is restricted by the position restricting component, and the position restricting angle is greater than 180 degrees.

The flexible display module 400 can be disposed on the first folding frame 101, the second folding frame 102, and the connection structure 103. The flexible display module 400 is simultaneously folded or unfolded with the first folding frame 101 and the second folding frame 102. Therefore, when the first folding frame 101 and the second folding frame 102 are completely unfolded, the fold marks of flexible display module 400 can be reduced due to the position restricting angle being greater than 180 degrees.

As illustrated in FIG. 1, in one embodiment, The folding display device can be a folding mobile phone, the first folding frame 101 and the second folding frame 102 can be a middle frame of the mobile phone, and the connection structure 103 can be a folding hinge. When the folding display device is folded, the folding hinge is connected to the middle frame of the mobile phone, and left and right middle frame structures of the folding mobile phone are in a wedge-shaped state when folded.

As illustrated in FIG. 1, in one embodiment, the connection structure 103 includes a first connection component and a second connection component. The first connection component is disposed on the first folding frame 101. The second connection component is disposed on the second folding frame 102. The first connection component and the second connection component rotate relatively. When an included angle between the first connection component and the second connection component is rotated to the position restricting angle, the position restricting component restricts the first connection component and the second connection component to rotate. Specifically, the position restricting angle is greater than 180 degrees and less than 183 degrees. Preferably, after calculating and controlling force and optical parameters of the flexible display module 400 by optical and stress simulation analysis, the position restricting angle can be 181.5 degrees This best position restricting angle can achieve the effect of reducing the fold marks of the screens. Specifically, as illustrated in FIG. 2 to FIG. 6, in one embodiment, the position restricting component includes a first position restricting bar 1131 and a second position restricting bar 1231. A first chute 1132 is defined in the first connection component, and the first chute 1132 is parallel to the first folding frame 101. A second chute 1232 is defined in the second connection component, and the second chute 1232 is parallel to the second folding frame 102. The first position restricting bar 1131 is slidably penetrated the first chute 1132, and the second position restricting bar 1231 is slidably penetrated the second chute 1232. In other word, a displacement route of the first position restricting bar 1131 is restricted by the first chute 1132, and a displacement route of the second position restricting bar 1231 is restricted by the second chute 1232. Therefore, a value of the position restricting angle can be determined by shapes of the first chute 1132 and the second chute 1232. In one embodiment, when the first folding frame 101 and the second folding frame 102 become to a completely unfolded state from a folded state, the first position restricting bar 1131 and the second position restricting bar 1231 slide toward directions away from the shaft in the first chute 1132 and the second chute 1232. In other words, movement ranges of the first position restricting bar 1131 and the second position restricting bar 1231 are restricted by the first chute 1132 and the second chute 1232. Therefore, the movement range of the first position restricting bar 1131 and the second position restricting bar 1231 determines a maximum unfoldable angle of the first folding frame 101 and the second folding frame 102.

In a further description, when the first folding frame 101 and the second folding frame 102 become to the completely unfolded state from the folded state, the first position restricting bar 1131 slides toward a direction away from the shaft in the first chute 1132, and the second position restricting bar 1231 slides toward a direction away from the shaft in the second chute 1232, but are not limited thereto. By a reasonable mechanism design, when the first folding frame 101 and the second folding frame 102 are changed from the folded state to the completely unfolded state, the first position restricting bar 1131 can be slid toward a direction close to the shaft in the first chute 1132 and, the second position restricting bar 1231 can be slid toward a direction toward close to the shaft in the second chute 1232.

In one embodiment, the first connection component further includes a first gear plate 1136, and the second connection component further includes a second gear plate 1236. The first chute 1132 can be defined in the first gear plate 1136, and the second chute 1232 can be defined in the second gear plate 1236. When the first folding frame 101 and the second folding frame 102 are folded or unfolded, the first position restricting bar 1131 slides in the first chute 1132 and drives the first gear plate 1136 to rotate, and the second position restricting bar 1231 slides in the second chute 1232 and drives the second gear plate 1236 to rotate.

Furthermore, the first position restricting bar 1131 and the second position restricting bar 1231 can be driven to correct movement directions by the first chute 1132 and the second chute 1232, so the first pivot plate 1133 and the second pivot plate 1233 are allowed to have good smoothness when moving. Furthermore, the first chute 1132 and the second chute 1232 have an accurate limit function, i.e., through calculation and design of a size, the connection structure 103 is exactly restricted when it is completely unfolded to 181.5°.

In one embodiment, when the first folding frame 101 and the second folding frame 102 are folded or unfolded, the first gear plate 1136 and the second gear plate 1236 are driven by the first position restricting bar 1131 and the second position restricting bar 1231 to rotate relatively. Therefore, the first folding frame 101 and the second folding frame 102 move simultaneously.

In one embodiment, the first connection component further includes a first transmission gear 1135, and the second connection component further includes a second transmission gear 1235. The first transmission gear 1135 and the second transmission gear 1235 are engaged with each other, the first gear plate 1136 and the first transmission gear 1135 are engaged with each other, and the second transmission gear 1235 and the second gear plate 1236 are engaged with each other. The first transmission gear 1135 and the second transmission gear 1235 are disposed between the first gear plate 1136 and the second gear plate 1236. By the aforesaid configuration relation, the first gear plate 1136 and the second gear plate 1236 being driven by the first position restricting bar 1131 and the second position restricting bar 1231 to rotate relatively can be realized.

Furthermore, the first connection component and the second connection component can be engaged with other by gears, or can be connected to each other by elastic elements, flexible materials, rotating shafts, sleeves, or other elements, so that the first connection component rotates corresponding to the second connection component.

However, the aforesaid is not limited thereto. For example, it is also possible to only dispose the first gear plate 1136 and the second gear plate 1236 to make the first gear plate 1136 and the second gear plate 1236 engage with each other, which makes the structure be simpler, and the effect of the first connection component rotating corresponding to the second connection can still be achieved.

Furthermore, the first connection component further a first pivot plate 1133, and the second connection component further includes a second pivot plate 1233. The first pivot plate 1133 and the second pivot plate 1233 are respectively disposed on the first folding frame 101 and the second folding frame 102. For example, the first pivot plate 1133 and the second pivot plate 1233 can be respectively screwed on the first folding frame 101 and the second folding frame 102. Furthermore, the first pivot plate 1133 and the second pivot plate 1233 are respectively connected to the first position restricting bar 1131 and the second position restricting bar 1231. Therefore, when the first folding frame 101 and the second folding frame 102 are moved, the first pivot plate 1133 and the second pivot plate 1233 are driven to move. Therefore, the first position restricting bar 1131 and the second position restricting bar 1231 are driven to move, and the first gear plate 1136 and the second gear plate 1236 are made to rotate relatively. In this embodiment, the first connection component and the second connection component being engaged with each other is taken as an example. The connection structure 103 further includes a first connection unit 1031, a second connection unit 1032, and a third connection unit 1033. The first connection component includes a first connection shaft 1134, the first transmission gear 1135, the first gear plate 1136, and a first elasticity element 1137. The second connection component includes a second connection shaft 1234, the second transmission gear 1235, the second gear plate 1236, and a second elasticity element 1237.

The first connection shaft 1134 penetrates the third connection unit 1033, the first gear plate 1136, the second connection unit 1032, the first elasticity element 1137, and the first connection unit in sequence 1031 in sequence. The second connection shaft 1234 penetrates the third connection unit 1033, the second gear plate 1236, the second connection unit 1032, the second elasticity element 1237, and the first connection unit 1031 in sequence.

Furthermore, the third connection unit 1033, the second connection unit 1032, and the first connection unit 1031 can be brackets or fixed blocks that restricts positions of the first gear plate 1136, the second gear plate 1236, the first transmission gear 1135, the second transmission gear 1235, the first elasticity element 1137, and the second elasticity element 1237, and the first elasticity element 1137 and the second elasticity element 1237 can be springs. Furthermore, in one embodiment, openings or via holes can be defined in the third connection unit 1033, the second connection unit 1032, and the first connection unit 1031, so that the positions of the first gear plate 1136, the second gear plate 1236, the first transmission gear 1135, the second transmission gear 1235, the first elasticity element 1137, and the second elasticity element 1237 can be restricted by the third connection unit 1033, the second connection unit 1032, and the first connection unit 1031.

In addition, in one embodiment, the first transmission gear 1135 and the second transmission gear 1235 both have connection shafts. The connection shafts can be disposed in shaft holes of the second connection unit 1032 and the third connection unit 1033 to make the first transmission gear 1135 and the second transmission gear 1235 be disposed between the second connection unit 1032 and the third connection unit 1033.

Furthermore, the first pivot plate 1133, the second pivot plate 1233, the first connection unit 1031, the second connection unit 1032, the third connection unit 1033, the first elasticity element 1137, the second elasticity element 1237, the first gear plate 1136, and the second gear plate 1236 are connected and integrated in one piece by the first connection shaft 1134, the second connection shaft 1234, the first position restricting bar 1131, and the second position restricting bar 1231. During operation, axes of the first connection shaft 1131 and the second connection shaft 1234 are rotation centers. Therefore, a folding function of the folding module 100 can be realized.

In addition, the first transmission gear 1135 and the second transmission gear 1235 having the connection shafts are connected to the second connection unit 1032 and the third connection unit 1033 through shaft holes of the second connection unit 1032 and the third connection unit 1033; the first transmission gear 1135 and the second transmission gear 1235 can drive the first gear plate 1136 and the second gear plate 1236 to rotate; and the first elasticity element 1137 and the second elasticity element 1237 can provide pressure to the first elasticity element 1136 and the second elasticity element 1236. Therefore, in the transmission process, there are drags on the first gear plate 1136 and the first transmission gear 1135, the first transmission gear 1135 and the second transmission gear 1235, and the second transmission gear 1235 and the second gear plate 1236. Therefore, when the folding module 100 is bent, it has a better hand feeling.

Besides, configuration of the first elasticity element 1137 and the second elasticity element 1237 can reduce gaps between the first transmission gear 1135, the second transmission gear 1235, the first gear plate 1136, and the second gear plate 1236 and the second connection unit 1032 and the third connection unit 1033. Therefore, the first transmission gear 1135, the second transmission gear 1235, the first gear plate 1136, and the second gear plate 1236 can rotate at correct positions, which makes every part be more compact and transmission be more stable.

Figure 6:
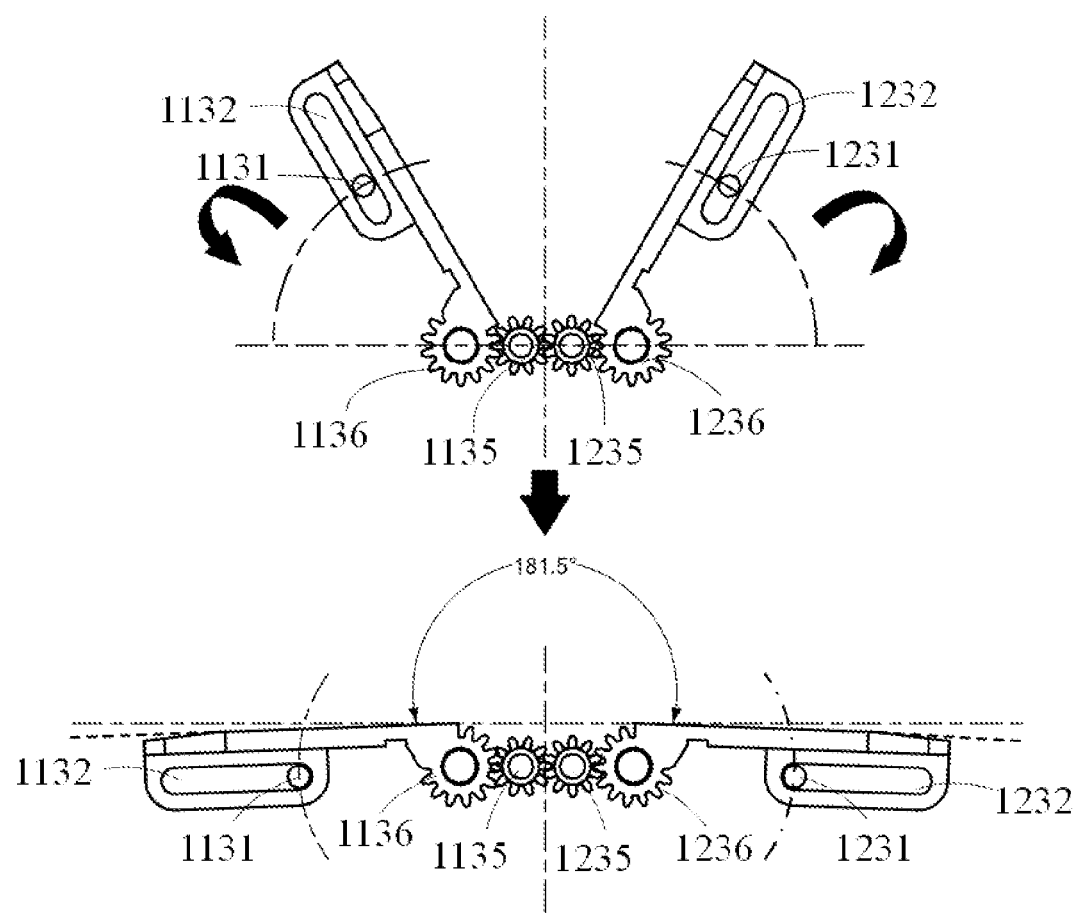
FIG. 6 is a first unfolded schematic diagram of the foldable display device of the present application.
Figure 7:
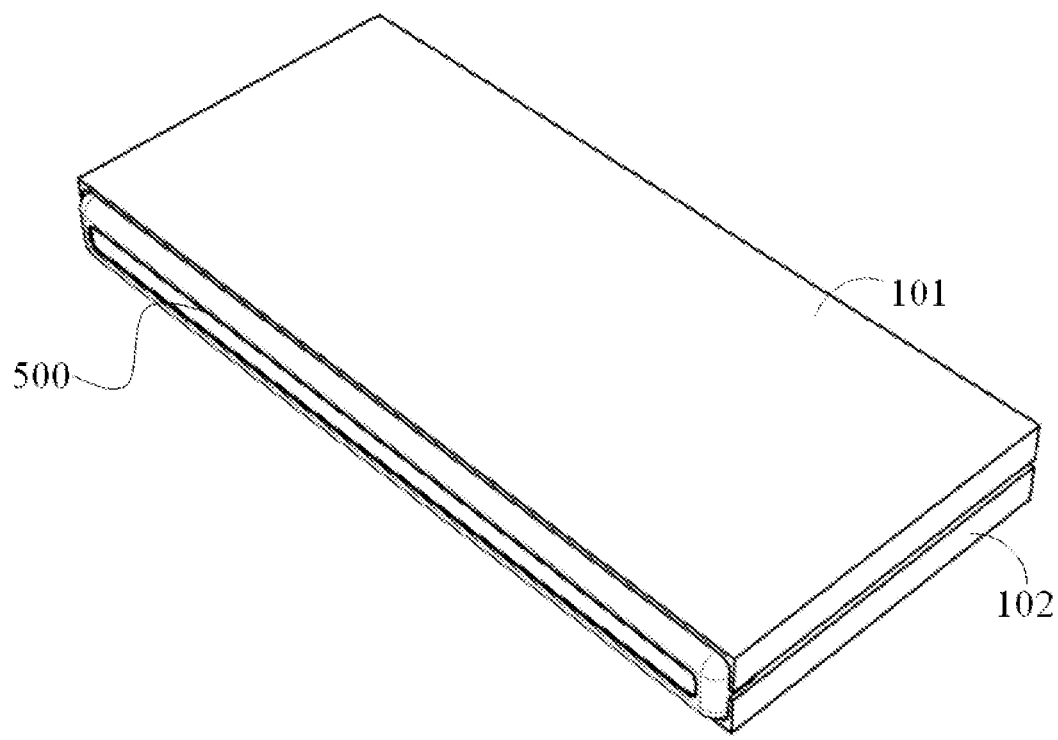
FIG. 7 is a folded schematic diagram of the foldable display device of the present application.
Figure 8:
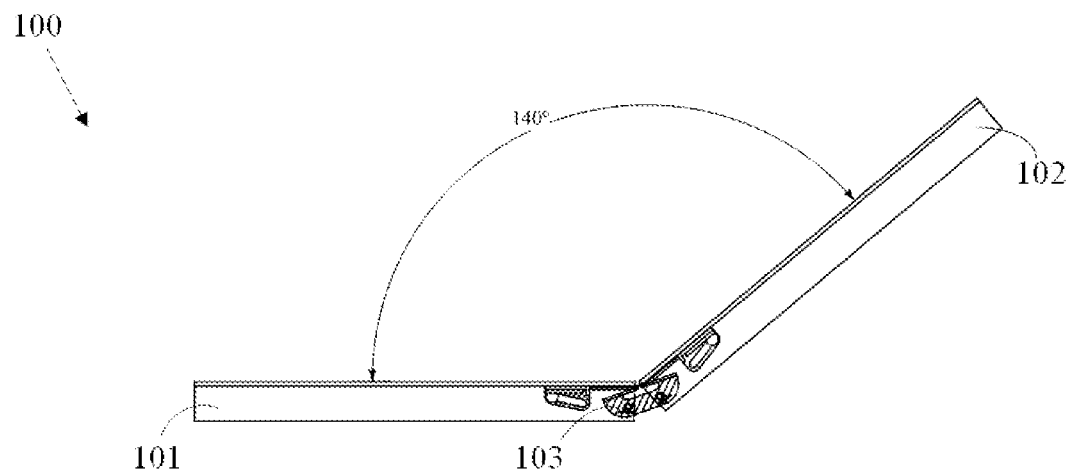
FIG. 8 is a second unfolded schematic diagram of the foldable display device of the present application.
Figure 9:
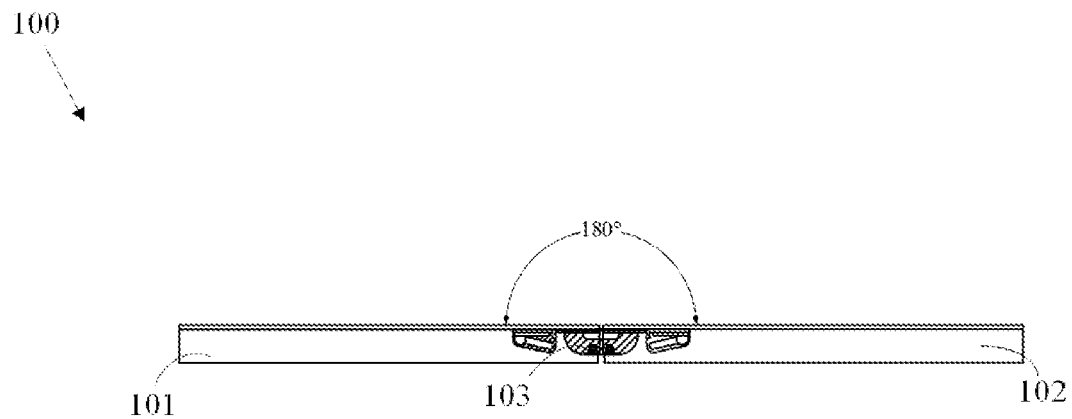
FIG. 9 is a third unfolded schematic diagram of the foldable display device of the present application.
Figure 10:
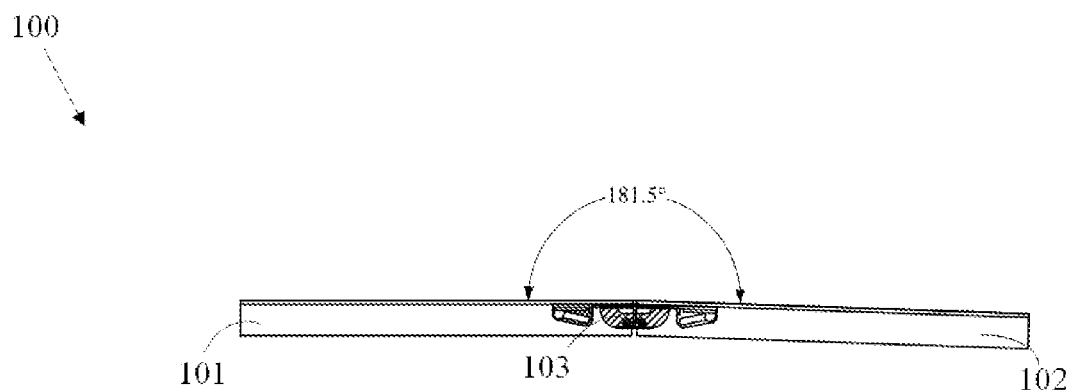
FIG. 10 is a fourth unfolded schematic diagram of the foldable display device of the present application.
Figure 11:
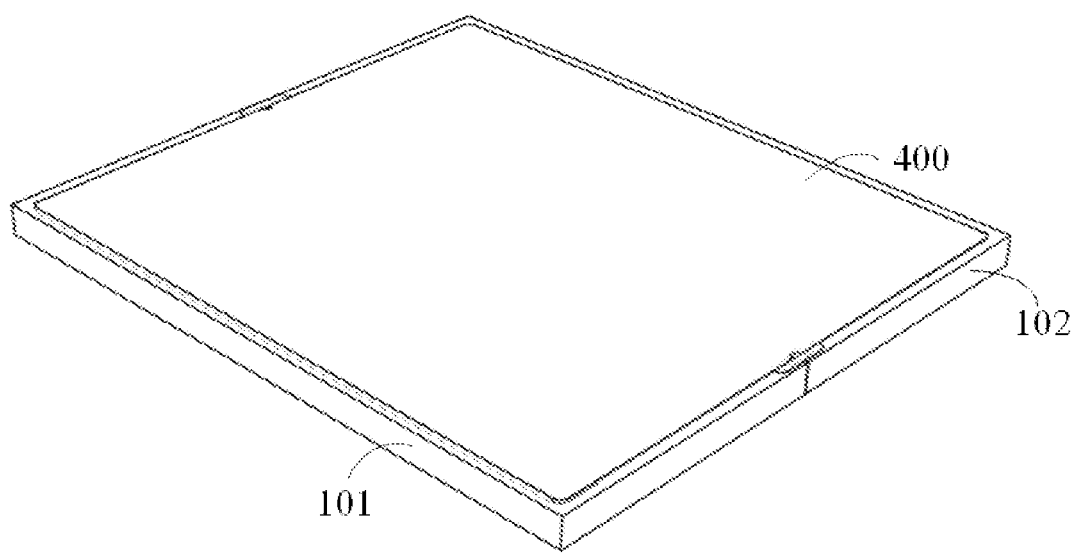
FIG. 11 is a fifth unfolded schematic diagram of the foldable display device of the present application.

Please refer to FIG. 6 FIG. 11, according to the aforesaid description, the first folding frame 101 and the second folding frame 102 can be folded to facilitate storage. When the first folding frame 101 and the second folding frame 102 are completely unfolded, for example, after the processes of FIG. 7 to FIG. 11 from the completely folded to the completely unfolded state, the position restricting angle between the first folding frame 101 and the second folding frame 102 can be restricted by the position restricting component. Specifically, as illustrated in FIG. 6, rotations of the first transmission gear 1135, the second transmission gear 1235, the first gear plate 1136, and the second gear plate 1236 are restricted by the first position restricting bar 1131, the second position restricting bar 1231, the first chute 1132, and the second chute 1232.

Figure 12:
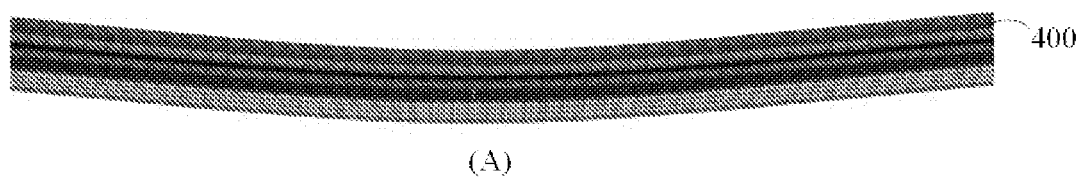
FIG. 12 is an emulation diagram of a flexible display module of the present application.
Figure 12:
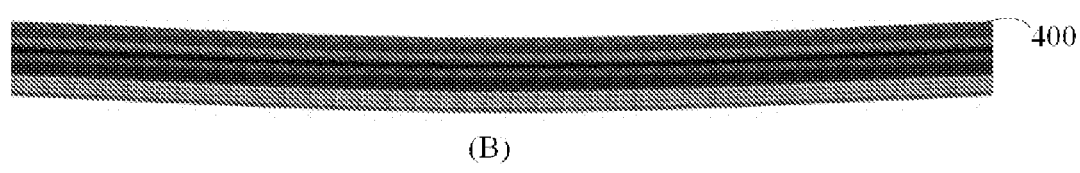

As illustrated in FIG. 12, wherein, part (A) of FIG. 12 is a schematic diagram of a simulated appearance of the flexible display module 400 after the first folding frame 101 and the second folding frame 102 are unfolded to 180° and are stood still for 300 seconds, and part (B) of FIG. 12 is a schematic diagram of a simulated appearance of the flexible display module 400 after the first folding frame 101 and the second folding frame 102 are unfolded to 181.5° and are stood still for 300 seconds. Compared the part (A) of FIG. 12 to the part (B) of FIG. 12, it can be significantly shown that the flexible display module 400 is relatively flat after the first folding frame 101 and the second folding frame 102 are unfolded to 181.5°.

Specifically, after the first folding frame 101 and the second folding frame 102 are completely unfolded, because a completely horizontal plane is not formed after the first folding frame 101 and the second folding frame 102 are completely unfolded, the flexible display module 400 can be bent reversely at a certain angle after unfolded. At this time, the flexible display module 400 is changed to a state of pulling outward. Therefore, the flexible display module 400 is in a proper pretension and stretched state, so that a region where the fold marks appear originally is slightly stretched and is restored to a flat state, thereby reducing the effect of the fold marks.

Therefore, in summary, the connection structure 103 of the present application is connected to the first folding frame 101 and the second folding frame 102. By design of the first position restricting bar 1131, the second position restricting bar 1231, the first chute 1132, and the second chute 1232, the limit unfolded angle of the connection structure 103 being able to be greater than 180 degrees is realized. Therefore, when the flexible display module 400 is completely unfolded, it is slightly stretched and returns to a flat state, and a force state of the flexible display module 400, optical characteristics of a screen, and human senses are not significantly affected.

Although the present application has been shown and described with respect to one or more implementations, equivalent alterations and modifications will occur to others skilled in the art based upon a reading and understanding of this specification and the annexed drawings. The present application includes all such modifications and alterations, and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the present application. In addition, while a particular feature of the present application may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

Which mentioned above is preferred embodiments of the present application, it should be noted that to those skilled in the art without departing from the technical theory of the present application, can further make many changes and modifications, and the changes and the modifications should be considered as the scope of protection of the present application.

What is claimed is:

1. A foldable display device, comprising:
   a folding module comprising:
   a first folding frame;
   a second folding frame disposed opposite to the first folding frame; and
   a connection structure connected to the first folding frame and the second folding frame, wherein the connection structure comprises a position restricting component, and
   wherein the first folding frame and the second folding frame are folded or unfolded relating to a shaft of the folding module; when the first folding frame and the second folding frame are completely unfolded, a position restricting angle between the first folding frame and the second folding frame is restricted by the position restricting component; and the position restricting angle is greater than 180 degrees; and
   a flexible display module disposed on the first folding frame, the second folding frame, and the connection structure, and simultaneously folded or unfolded with the first folding frame and the second folding frame;
   wherein the connection structure comprises a first connection component and a second connection component, the first connection component is disposed on the first folding frame, the second connection component is disposed on the second folding frame, and the first connection component and the second connection component rotate relatively; the position restricting component comprises a first position restricting bar and a second position restricting bar, a first chute is defined in the first connection component, and a second chute is defined in the second connection component the first position restricting bar is slidably penetrated the first chute, the second position restricting bar is slidably penetrated the second chute, a displacement route of the first position restricting bar is restricted by the first chute, and a displacement route of the second position restricting bar is restricted by the second chute.

2. The foldable display device as claimed in claim 1, wherein when an included angle between the first connection component and the second connection component is rotated to the position restricting angle, the position restricting component restricts the first connection component and the second connection component to rotate.

3. The foldable display device as claimed in claim 1, wherein the first chute is parallel to the first folding frame, and the second chute is parallel to the second folding frame.

4. The foldable display device as claimed in claim 1, wherein when the first folding frame and the second folding frame become to a completely unfolded state from a folded state,
   the first position restricting bar slides toward a direction away from the shaft in the first chute, and
   the second position restricting bar slides toward a direction away from the shaft in the second chute.

5. The foldable display device as claimed in claim 1, wherein the first connection component comprises a first gear plate, the second connection component comprises a second gear plate, the first chute is defined in the first gear plate, and the second chute is defined in the second gear plate.

6. The foldable display device as claimed in claim 5, wherein when the first folding frame and the second folding frame are folded or unfolded,
   the first position restricting bar slides in the first chute and drives the first gear plate to rotate, and
   the second position restricting bar slides in the second chute and drives the second gear plate to rotate.

7. The foldable display device as claimed in claim 6, wherein when the first folding frame and the second folding frame are folded or unfolded, the first gear plate and the second gear plate are driven by the first position restricting bar and the second position restricting bar to rotate relatively.

8. The foldable display device as claimed in claim 6, wherein the first connection component comprises a first transmission gear, the second connection component comprises a second transmission gear, the first transmission gear and the second transmission gear are engaged with each other, the first gear plate and the first transmission gear are engaged with each other, the second transmission gear and the second gear plate are engaged with each other, and the first transmission gear and the second transmission gear are disposed between the first gear plate and the second gear plate.

9. The foldable display device as claimed in claim 6, wherein the first connection component comprises a first pivot plate, the second connection component comprises a second pivot plate, the first pivot plate and the second pivot plate are respectively disposed on the first folding frame and the second folding frame, and the first pivot plate and the second pivot plate are respectively connected to the first position restricting bar and the second position restricting bar.

10. The foldable display device as claimed in claim 9, wherein the connection structure comprises a first connection unit, a second connection unit, and a third connection unit, the first component comprises a first connection shaft and a first elasticity element, the second connection component comprises a second connection shaft and a second elasticity element, the first connection shaft penetrates the third connection unit, the first gear plate, the second connection unit, the first elasticity element, and the first connection unit in sequence, and the second connection shaft penetrates the third connection unit, the second gear plate, the second connection unit, the second elasticity element, and the first connection unit in sequence.

11. The foldable display device as claimed in claim 1, wherein the position restricting angle is 181.5 degrees.

12. A foldable display device, comprising:
a folding module comprising:
a first folding frame;
a second folding frame disposed opposite to the first folding frame; and
a connection structure connected to the first folding frame and the second folding frame, wherein the connection structure comprises a position restricting component, and
wherein the first folding frame and the second folding frame are folded or unfolded relating to a shaft of the folding module; when the first folding frame and the second folding frame are completely unfolded, a position restricting angle between the first folding frame and the second folding frame is restricted by the position restricting component; and the position restricting angle is greater than 180 degrees and less than 183 degrees; and
a flexible display module disposed on the first folding frame, the second folding frame, and the connection structure, and simultaneously folded or unfolded with the first folding frame and the second folding frame;
wherein the connection structure comprises a first connection component and a second connection component, the first connection component is disposed on the first folding frame, the second connection component is disposed on the second folding frame, and the first connection component and the second connection component rotate relatively; the position restricting component comprises a first position restricting bar and a second position restricting bar, a first chute is defined in the first connection component, and a second chute is defined in the second connection component; the first position restricting bar is slidably penetrated the first chute, the second position restricting bar is slidably penetrated the second chute, a displacement route of the first position restricting bar is restricted by the first chute, and a displacement route of the second position restricting bar is restricted by the second chute.

13. The foldable display device as claimed in claim 12, wherein
when an included angle between the first connection component and the second connection component is rotated to the position restricting angle, the position restricting component restricts the first connection component and the second connection component to rotate.

14. A foldable display device comprising:
a folding module comprising:
a first folding frame;
a second folding frame disposed opposite to the first folding frame; and
a connection structure connected to the first folding frame and the second folding frame, wherein the connection structure comprises a position restricting component, and
wherein the first folding frame and the second folding frame are folded or unfolded relating to a shaft of the folding module; when the first folding frame and the second folding frame are completely unfolded, a position restricting angle between the first folding frame and the second folding frame is restricted by the position restricting component and the position restricting angle is greater than 180 degrees and less than 183 degrees; and
a flexible display module disposed on the first folding frame, the second folding frame, and the connection structure, and simultaneously folded or unfolded with the first folding frame and the second folding frame,
the connection structure comprises a first connection component and a second connection component, the first connection component is disposed on the first folding frame, the second connection component is disposed on the second folding frame, the first connection component and the second connection component rotate relatively,
when an included angle between the first connection component and the second connection component is rotated to the position restricting angle, the position restricting component restricts the first connection component and the second connection component to rotate; wherein the position restricting component comprises a first position restricting bar and a second position restricting bar, a first chute is defined in the first connection component, a second chute is defined in the second connection component, the first chute is parallel to the first folding frame, the second chute is parallel to the second folding frame, the first position restricting bar is slidably penetrated the first chute, the second position restricting bar is slidably penetrated the second chute, a displacement route of the first position restricting bar is restricted by the first chute, and a displacement route of the second position restricting bar is restricted by the second chute.

15. The foldable display device as claimed in claim 14, wherein when the first folding frame and the second folding frame become to a completely unfolded state from a folded state, the first position restricting bar slides toward a direction away from the shaft in the first chute, and the second position restricting bar slides toward a direction away from the shaft in the second chute.

16. The foldable display device as claimed in claim 15, wherein the first connection component comprises a first gear plate, the second connection component comprises a second gear plate, the first chute is defined in the first gear plate, the second chute is defined in the second gear plate, when the first folding frame and the second folding frame are folded or unfolded, the first position restricting bar slides in the first chute and drives the first gear plate to rotate, the second position restricting bar slides in the second chute and drives the second gear plate to rotate, when the first folding frame and the second folding frame are folded or unfolded, and the first gear plate and the second gear plate are driven by the first position restricting bar and the second position restricting bar to rotate relatively.

17. The foldable display device as claimed in claim 16, wherein the first connection component comprises a first transmission gear and a first pivot plate, the second connection component comprises a second transmission gear and a second pivot plate, the first transmission gear and the second transmission gear are engaged with each other, the first gear plate and the first transmission gear are engaged with each other, the second transmission gear and the second gear plate are engaged with each other, the first transmission gear and the second transmission gear are disposed between the first gear plate and the second gear plate, the first pivot plate and the second pivot plate are respectively disposed on the first folding frame and the second folding frame, and the first pivot plate and the second pivot plate are respectively connected to the first position restricting bar and the second position restricting bar.

18. The foldable display device as claimed in claim 17, wherein the connection structure comprises a first connection unit, a second connection unit, and a third connection unit, the first component comprises a first connection shaft and a first elasticity element, the second connection component comprises a second connection shaft and a second elasticity element, the first connection shaft penetrates the third connection unit, the first gear plate, the second connection unit, the first elasticity element, and the first connection unit in sequence, and the second connection shaft penetrates the third connection unit, the second gear plate, the second connection unit, the second elasticity element, and the first connection unit in sequence.

\* \* \* \* \*